(12) United States Patent
Lim et al.

(10) Patent No.: US 6,765,737 B1
(45) Date of Patent: Jul. 20, 2004

(54) VARIABLE TRACK DENSITIES ON A RECORDING MEDIUM TO COMPENSATE FOR NON-REPEATABLE RUNOUT (NRRO) ERROR

(75) Inventors: Choonkiat Lim, Singapore (SG); Xiong Liu, Singapore (SG); Joseph Cheng-Tsu Liu, Singapore (SG); Kevin A. Gomez, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/519,910

(22) Filed: Mar. 7, 2000

Related U.S. Application Data
(60) Provisional application No. 60/130,314, filed on Apr. 21, 1999.

(51) Int. Cl.$^7$ ................................................. G11B 5/09
(52) U.S. Cl. ..................................... 360/48; 360/77.04
(58) Field of Search .............................. 360/48, 77.05, 360/77.08, 75, 77.02, 77.04

(56) References Cited

U.S. PATENT DOCUMENTS

| | | | |
|---|---|---|---|
| 4,945,427 A | 7/1990 | Cunningham et al. | 360/75 |
| 5,682,274 A | 10/1997 | Brown et al. | 360/77.04 |
| 5,930,069 A | 7/1999 | Kim | 360/78.14 |
| 5,940,237 A | 8/1999 | Takagi | 360/75 |
| 6,061,197 A * | 5/2000 | Wiselogel | 360/60 |
| 6,437,947 B1 * | 8/2002 | Uno | 360/78.04 |

* cited by examiner

*Primary Examiner*—David Hudspeth
*Assistant Examiner*—Varsha A. Kapadia
(74) *Attorney, Agent, or Firm*—Kirk Cesari (57) ABSTRACT

A disc drive includes a base and a disc rotatably attached to the base. The disc has an inner diameter and an outer diameter and a plurality of tracks. Information is written on the plurality of tracks. The plurality of tracks are written at a variable track pitch. The tracks positioned near the outer diameter are wider in pitch than the tracks positioned near the inner diameter. The plurality of tracks further include a first group of tracks written at a first track pitch, and a second group of tracks written at a second track pitch. The track pitch of each of the first group and the second group of tracks is selected such that the percentage of track misregistration for each group will be substantially the same. This method provides a means to increase storage capacity for a predetermined track misregistration budget.

14 Claims, 8 Drawing Sheets

VARIABLE TRACK DENSITIES ON A RECORDING MEDIUM TO COMPENSATE FOR NON-REPEATABLE RUNOUT (NRRO) ERROR

RELATED APPLICATION

This application claims the benefit of U.S. Provisional Application Serial No. 60/130,314, filed Apr. 21, 1999 under 35 U.S.C. 119(e).

FIELD OF THE INVENTION

The present invention relates to the field of mass storage devices. More particularly, this invention relates to an apparatus and method for formatting a disc within a disc drive. More specifically, the present invention is directed toward the track density as it relates to track misregistration within a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are an information storage disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track.

The methods for positioning the transducers can generally be grouped into two categories. Disc drives with linear actuators move the transducer linearly generally along a radial line to position the transducers over the various tracks on the information storage disc. Disc drives also have rotary actuators which are mounted to the base of the disc drive for arcuate movement of the transducers across the tracks of the information storage disc. Rotary actuators position transducers by rotationally moving them to a specified location on an information recording disc. A rotary actuator positions the transducer quickly and precisely. For example, the rotary actuator moves the transducer at 20° during a long seek. The rotary actuator undergoes a maximum of 90 G's of force when moved.

The actuator is rotatably attached to a shaft via a bearing cartridge which generally includes one or more sets of ball bearings. The shaft is attached to the base and may be attached to the top cover of the disc drive. A yoke is attached to the actuator. The voice coil is attached to the yoke at one end of the rotary actuator. The voice coil is part of a voice coil motor which is used to rotate the actuator and the attached transducer or transducers. A permanent magnet is attached to the base and cover of the disc drive. The voice coil motor which drives the rotary actuator comprises the voice coil and the permanent magnet. The voice coil is attached to the rotary actuator and the permanent magnet is fixed on the base. A yoke is generally used to attach the permanent magnet to the base and to direct the flux of the permanent magnet. Since the voice coil sandwiched between the magnet and yoke assembly is subjected to magnetic fields, electricity can be applied to the voice coil to drive it so as to position the transducers at a target track.

One constant goal associated with disc drives is to increase the amount of data that can be stored on the disc drive. There are, of course, many techniques for increasing the amount of data on a disc drive. One of the techniques is to increase the number of tracks per inch that are positioned on the surface of a disc. In other words, the number of tracks per inch ("TPI") is increased. Another way of saying the same thing is that the track density is increased.

Increasing the track density must be balance against other problems within the disc drive. One of the problems is increased error rates due to track misregistration. Track misregistration is interference due to the inability of a recording system to maintain the relative positions of the heads and the data track on the media exactly. In a disc drive, the imperfect reproducibility of the moving-head positioning system and differential thermal expansion are among the causes of misregistration. Other causes of track misregistration are windage and the amount of vibration of the disc itself. Windage and vibration generally have a more pronounced effect at the outer tracks on the disc. The greater relative motion between the disc and transducing head near the outer edge of the disc provides for increased windage at the outer diameter of the disc. In fact, as the actuator and attached transducers are moved from the inner diameter to the outer diameter, the windage effect becomes progressively more pronounced.

Vibration also has a more pronounced effect at the outer diameter. The disc is attached to a hub at its inner diameter.

The edge of the disc, therefore, is attached more like a cantilevered beam at the inner diameter. As with a cantilevered beam, vibration effects are more pronounced the further from the attachment point. In other words, if the disc is vibrating, the vibration will generally be more pronounced at the outer diameter. Thus, if all other factors remained equal, track misregistration will be higher at the outer diameter than at the inner diameter.

In the past, disc drives were designed with the knowledge that the percentage of occurrences of track misregistration was generally the worst at the outer diameter of the disc. As a result, the track density at the outer diameter of the disc was one of the principal influences in hard disc drive design. Designers knew that by controlling track misregistration the number of resulting read or write errors could also be controlled. In practice, errors occur if the track misregistration is approximately greater than 12% of the track width. Designers typically de signed the disc drive so that the discs had a constant track density across the surface or the recording surface of the disc. In order to ensure that no more than 12% track misregistration occurred, designers would select a track density at the outer diameter that would produce no more than 12% or some other selected percentage of track misregistration. This track density would then be used to write across the surface of the disc. In essence, designers of the disc drives wrote the tracks on the disc at a constant track density so that when the worst case appeared at the outer diameter of the tracks, the read and write channel could accommodate the worst case without producing excessive read or write errors. The problem with this scheme is that it limits the amount of data that can be stored on the disc. In addition, it fails to consider that more data could be written on the inner diameter to increase the capacity of the disc and the disc drive. Furthermore, more errors occur on the outer diameter than on the inner diameter and, therefore, you do not have a uniform distribution of read or write errors across the surface of the disc.

Techniques have been developed to minimize the track misregistration problems. The method and apparatus to correct for read and write element misregistration offsets was developed by Brown in U.S. Pat. No. 5,682,274. Improving the air flow in hard disc drive (HDD) to reduce the track misregistration (TMR) budget was used by the Freeman U.S. Pat. No. 4,147,229. The method to reduce disc flutter non-repeatable runout (NRRO) was introduced by Imai. Zero acceleration path (ZAP) method to reduce repeatable runout (RRO) by Szita.

All of the above methods can significantly improve the TMR in HDD applications. Especially the ZAP method, it makes the RRO become not the major contributor for TMR. However, this makes the NRRO component in TMR become more outstanding. All of the above methods and present servo track writing process did not consider the difference of TMR along the media radius. Contributions from windage effects, disc flutter, microjog compensation error, mechanical resonances make the TMR at outer diameter (OD) much worse than inner diameter (ID). The example will be described in the next section.

What is needed is a disc drive having additional capacity. What is needed is disc for a disc drive which allows additional information to be stored on the disc drive. Furthermore, the disc should be formatted to allow for additional data to be stored on the disc. What is also needed is a disc drive that limits the amount of read and write errors that occur so that the access times to information including customer data remains low. What is also needed is a disc and disc drive that does not allow the occurrence of track misregistration to climb over a selected percentage. A method and apparatus are also needed which can be accommodated using manufacturing techniques close to current manufacturing techniques.

SUMMARY OF THE INVENTION

A disc drive includes a base, and a disc rotatably attached to the base. The disc has an inner diameter and an outer diameter and a plurality of tracks. Information is written on the plurality of tracks. The plurality of tracks are written at a variable track pitch. The tracks positioned near the outer diameter are wider in pitch than the tracks positioned near the inner diameter. The plurality of tracks further include a first group of tracks written at a first track pitch, and a second group of tracks written at a second track pitch. The first group of tracks has a greater track pitch than the second group of tracks. The first group of tracks is positioned at a greater radial distance from the center of the disc than the first group of tracks. The first group of tracks or the second group of tracks has a greater track pitch than the other of the first group of tracks or the second group of tracks. Furthermore, the track pitch of each of the first group and the second group of tracks is selected such that the percentage of track misregistration for each group will be substantially the same. The track pitch is varied to keep the percentage of track misregistration for each group substantially the same. The disc drive also includes an actuator having a transducer for reading and writing to at least two of the plurality of tracks on the disc. The transducer writes data at different frequencies.

Also disclosed is a disc for a disc drive including a first surface, a second surface, and a plurality of concentric tracks located on one of the first surface or the second surface. The plurality of concentric tracks include a first group of tracks written at a first track density, and a second group of tracks written at a second track density. The first track density is different than the second track density. If first track density is greater than the second track density, the first group of tracks is positioned nearer to the center of the disc than the second group of tracks. On the disc, the first group of tracks has information written at a different frequency that the information in the second group of tracks. A third group of tracks written at a third track density which is different than the first track density and the second track density is also contemplated. The track density for the first group is selected so that the percentage of track misregistration is substantially equal to a selected value. The track density for the second group is also selected so that the percentage of track misregistration is substantially equal to a selected value. In other words, the track density for the first group and the track density for the second group is selected so that the percentage of track misregistration is substantially equal to a selected value. In addition, the track density for the first group and the track density for the second group is selected in response to the percentage of track misregistration.

A disc drive is also disclosed which includes a base and a disc rotatably attached to the base. The disc has tracks for storing information. The disc drive also includes a movable actuator having a transducer positionable near said tracks, and a device for maintaining the percentage of occurrences of track misregistration between the track and the transducer to a selected range.

Advantageously, the disc drive which uses the above inventions has additional capacity. The disc for the disc drive allows additional information to be stored on the disc drive without an appreciable rise in the error rate. The disc is formatted to allow for additional data to be stored on the disc. The tracks per inch or track density of the groups of tracks on the disc of the disc drive serves to limit the amount of read and write errors that occur. As a result, the access times to information including customer data is unaffected by increased track density since the track density is selected so that the percentage of track misregistrations stays within a selected range. The result is that the disc in the disc drive is formatted so as not to allow the occurrence of track misregistration to climb over a selected percentage. Still a further advantage is that the method and apparatus used to format the disc in the disc drive do not deviate appreciably from current technologies. Therefore, the above inventions can be accommodated using manufacturing techniques close to current manufacturing techniques.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
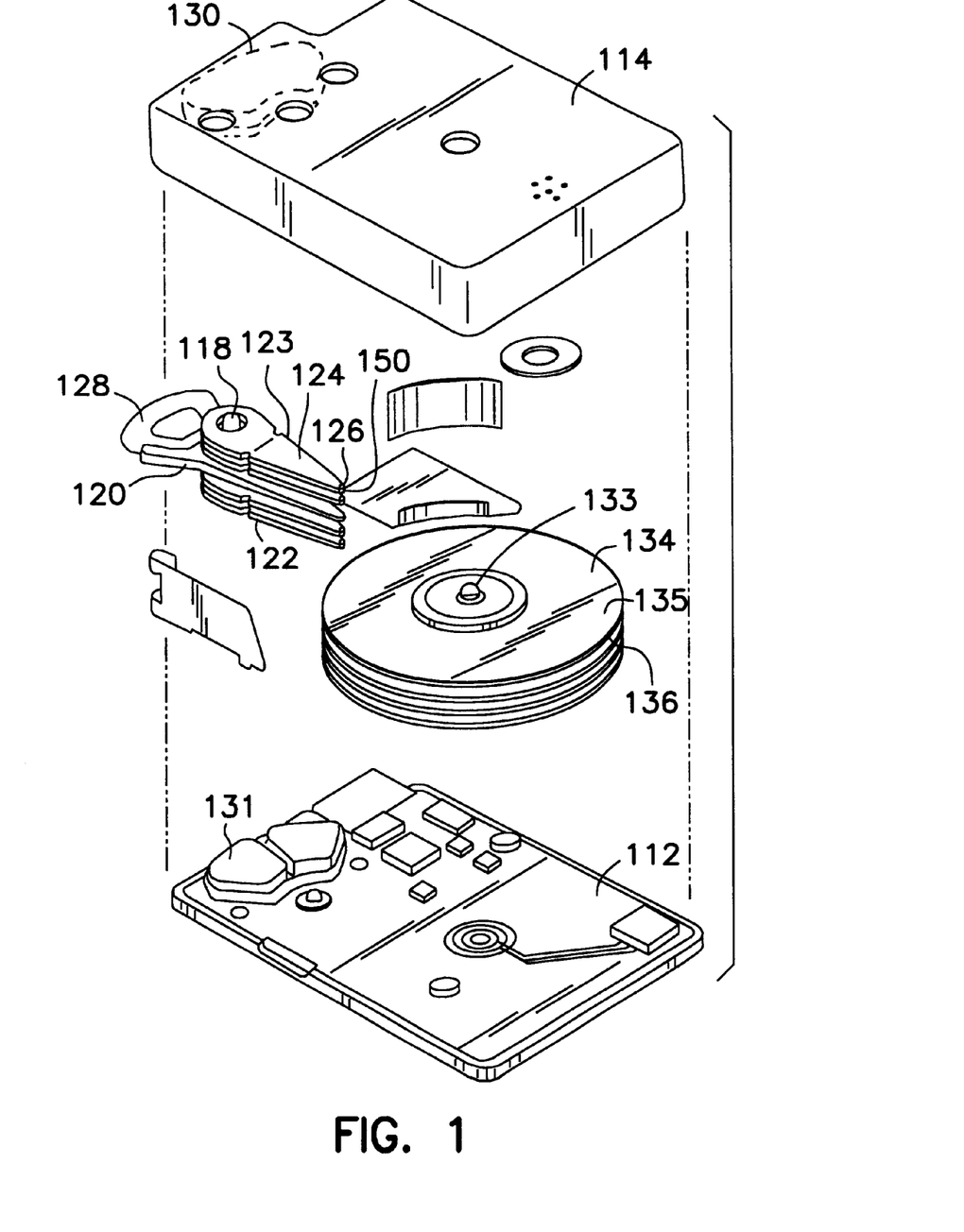
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. An inertia ring 500 is attached to the cover 114. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. Each of the discs 134 has a first recording surface 135 and a second recording surface 136. Only one disc 134 is numbered for the sake of clarity. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
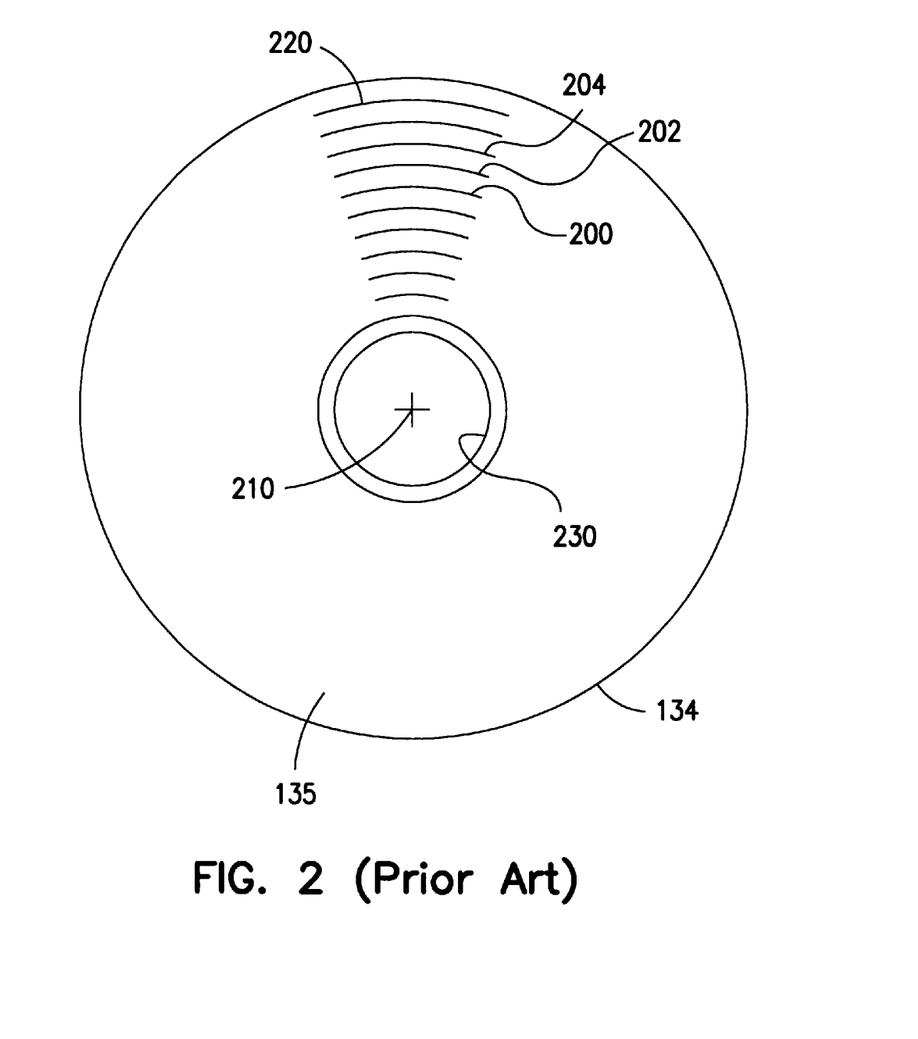
FIG. 2 is a schematic representation of the tracks on the surface of a disc within a disc drive wherein the track density is uniform across the surface of the disc.

FIG. 2 is a schematic representation of the tracks 200 on a disc drive 100 wherein the track density is uniform across the surface 135 of the disc 134. Each of the tracks 200 is a concentric circle about the center point 210 of the disc 134. The radial position of each of the tracks is different by a uniform set amount. For example, for a disc drive with 18,000 tracks per inch, the radial position of track 200 is 55.6 microinches different than the radial position of the track 202 and the radial position of the track 202 is 55.6 microinches different than the radial position of the track 204. As mentioned previously in the Background of the Invention section, the track misregistration at the outer diameter 220 of the disc 134 is higher than the track misregistration that occurs on the tracks 200 near the inner diameter 230 of the disc 134. The spacing of the tracks 200 on the disc 134 is determined by the track misregistration that occurs at the outer diameter 220 of the disc 134. In other words, designers used to select the tracks per inch or track density based upon the number of occurrences of the track misregistration that occurred at the tracks near the outer diameter 220 of the disc 134. This track bridge or track density was then used across the surface of the disc from the outer diameter 220 to the inner diameter 230 of the disc. Basically, when the disc is servo written, the servo writer would be moved in an incremental fashion so that tracks having radial positions that vary uniformly would be written to the surface 135 of the disc 134. The ability to increase the track density is limited by the track misregistration at the outer diameter.

Figure 3:
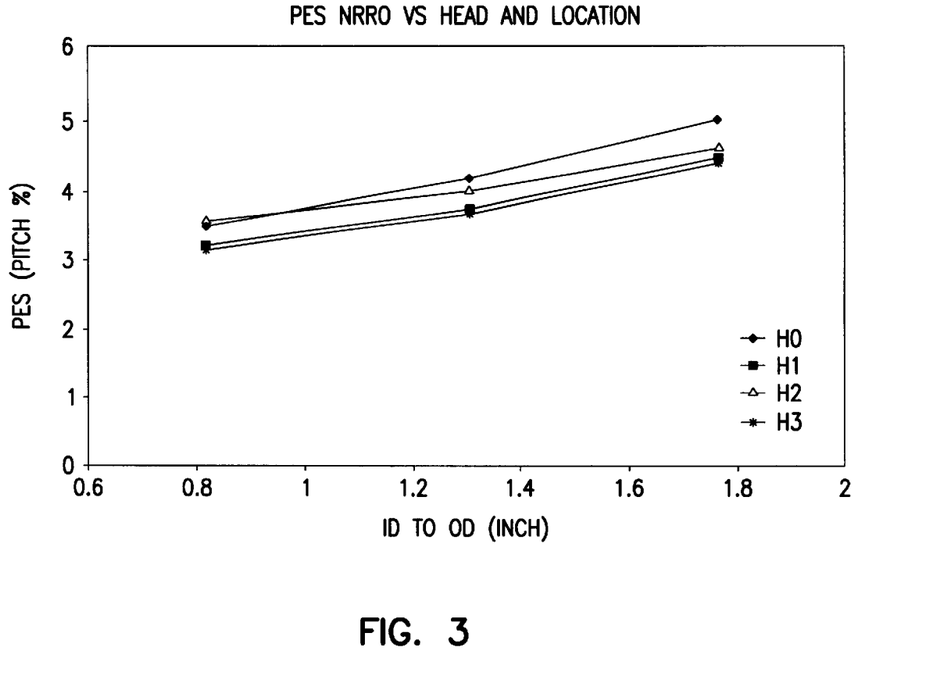
FIG. 3 is graph showing the amount of position error contributing to track misregistration as a function of the position of the head with respect to the disc.

FIG. 3 is a graph showing the amount of track misregistration as a function of the position of the head 126 with respect to the disc 134. In the particular disc drive depicted in FIG. 3, the drive has two discs 134 with a total of four different surfaces (two for each disc). Four transducing heads 150 carried by four different sliders 126 are each positioned near a surface of the first and second discs 134. As shown in FIG. 3, the position error signal (PES) due to non-repeatable runout (NRRO) is plotted versus the head location with respect to the disc. The position error signal (PES) from the non-repeatable runout (NRRO) is a major contributor to the track misregistration. In FIG. 3, all four heads are plotted but choosing the top line as one indicative example, it can be seen that underneath head 2 having points that are open triangles, the number of position error signals at the inner diameter (0.8 inches) is less than the number of position error signals received at the outer diameter (1.8 inches). As can be seen from FIG. 3 for each of the heads, head 0, head 1, head 2 and head 3, the position error signal is less at the inner diameter than at the outer diameter. When the heads are positioned on a disc having all the tracks on the surface 135 substantially equally spaced, the monotrack misregistration at the inner diameter is always less than the amount of track misregistration at the outer diameter as depicted by FIG. 3.

Figure 4:
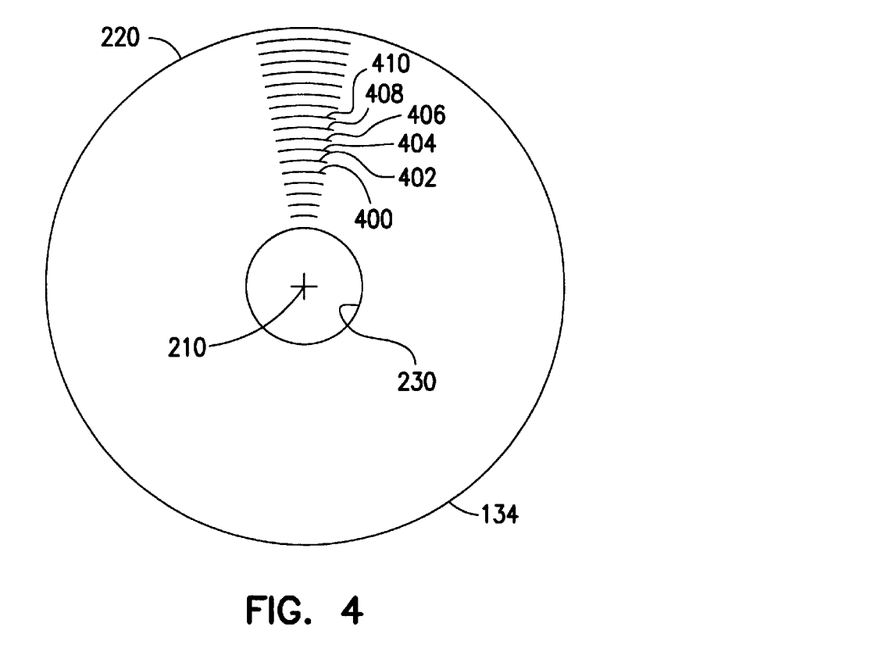
FIG. 4 is a schematic representation of the tracks on the surface of a disc within a disc drive having a variable track density.

FIG. 4 is a schematic representation of the tracks 400, 402, 403, 404, 406, 408 and 410 on the surface of a disc 134. On this particular disc 134, the tracks 400, 402, 404, 406, 408 and 410 are constantly varying such that the difference in radial distance between two adjacent tracks as the tracks are positioned further out toward the outer diameter becomes progressively larger. In other words, the radial difference in distance between tracks 400 and 402 will be less than the radial difference in distance between tracks 402 and 404. In other words, as the track is more closely positioned with the outer diameter 220 of the disc 134, the difference in radial distance between the tracks is greater at or near the outer diameter 220. Another way of looking at this is that the tracks at the inner diameter are very closely spaced or are thinner than the tracks near the outer diameter 220. With this type of disc formatting, the percentage of occurrences of track misregistrations is generally about equal across the radial distance of the disc.

Figure 5:
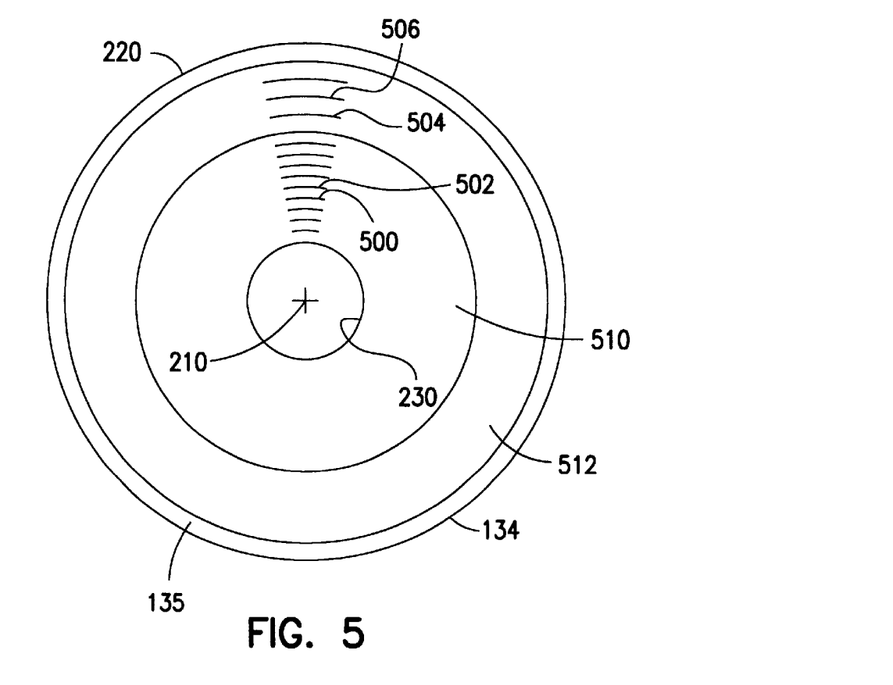
FIG. 5 is a schematic representation of the tracks on the surface of a disc within a disc drive wherein the tracks are placed into two zones, each zone having a different track density than the another zone.

FIG. 5 depicts another schematic representation of yet another embodiment of the invention. FIG. 5 is a schematic representation of the tracks on the surface 135 of the disc 134 within a disc drive wherein the tracks 500, 502, 504 and 506 are placed into a first zone 510 and into a second zone 512. Tracks 500 and 502 are placed in the first zone 510. The tracks 500, 502 and the other tracks within the zone 510 are equally spaced or have a track density which is uniform within the zone 510. The tracks 504 and 506 are placed within a second zone 512. The tracks 504 and 506 within zone 512, as well as the other tracks within zone 512, are also equally spaced and have the same track density among the tracks in that zone 512. The track spacing in the first zone 510 is closer than the track spacing in the second zone 512. The track spacing shown in each of the zones 510 and 512 are only schematic and the actual spacing is much closer than is shown in these two zones in FIG. 5. In other words, the tracks 502, 500 and 504, 506 shown in the two zones 510 and 512, are depicted with extremely wide spacings for the sake of describing the invention. In actuality, the spacings would be much closer. The tracks within zone 510 are much more closely spaced than the tracks in zone 512. In other words, the track density or the number of tracks per inch in the first zone 510 are different than the number of tracks per inch or the track density found in the second zone 512. It should also be noted that the tracks in the zone 512 which is closer to the outer diameter 220 of the disc 134 are less densely spaced. In other words, the tracks per inch in zone 512 are less than the tracks per inch shown in the inner zone 510. Having track spacing which is less dense in the outer zone minimizes the track misregistration occurrences in the outer zone. The spacing within each of the zones is selected so that the number of occurrences of track misregistration is approximately equal within the zone. It should be noted, however, that even within a zone, the number of occurrences of track misregistrations at the outer edge of the zone, which is at a greater radial distance from the center 210 of the disc, is larger than the number of occurrences toward the inner part of the zone.

Figure 6:
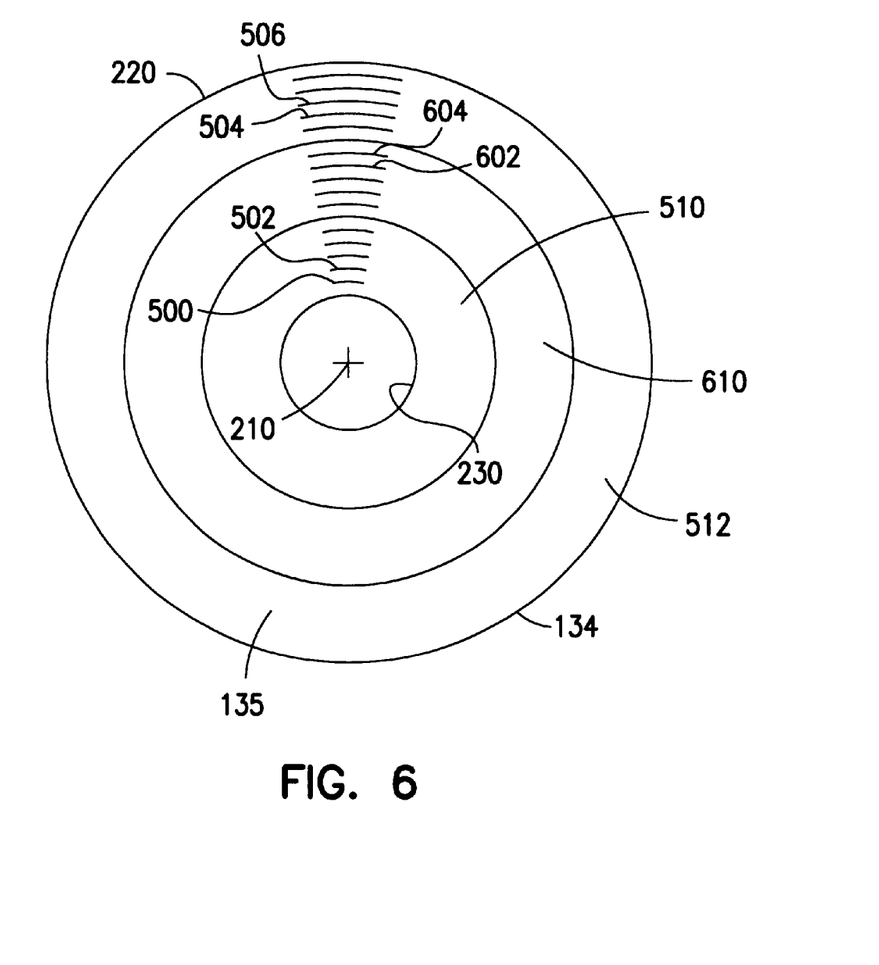
FIG. 6 is a schematic representation of the tracks on the surface of a disc within a disc drive wherein the tracks are placed into plurality zones, each zone having a different track density than the another zone.

FIG. 6 shows a schematic representation of tracks on the surface of the disc wherein the tracks on the disc 500, 502, 602, 604, 504 and 506 are placed into a plurality of zones 510, 512 and 610. FIG. 6 is very similar to FIG. 5. The difference between FIG. 5 and FIG. 6 is that an intermediate zone 610 is placed between the zones 510 and 512. It should be noted that any number of zones or groups of tracks may be made to form a zone 510, 512 or 610. The determining factor generally is that the number of track misregistrations that occur within the zone should be within a range of selected numbers or should be close to equal across the zone. The chief advantage to grouping tracks or making them into zones where the tracks per inch or density of the tracks is higher at the inner diameter than at the outer diameter is that the capacity of the disc drive can be increased dramatically without an increase in the number of errors that occur during a read or a write.

Figure 7:
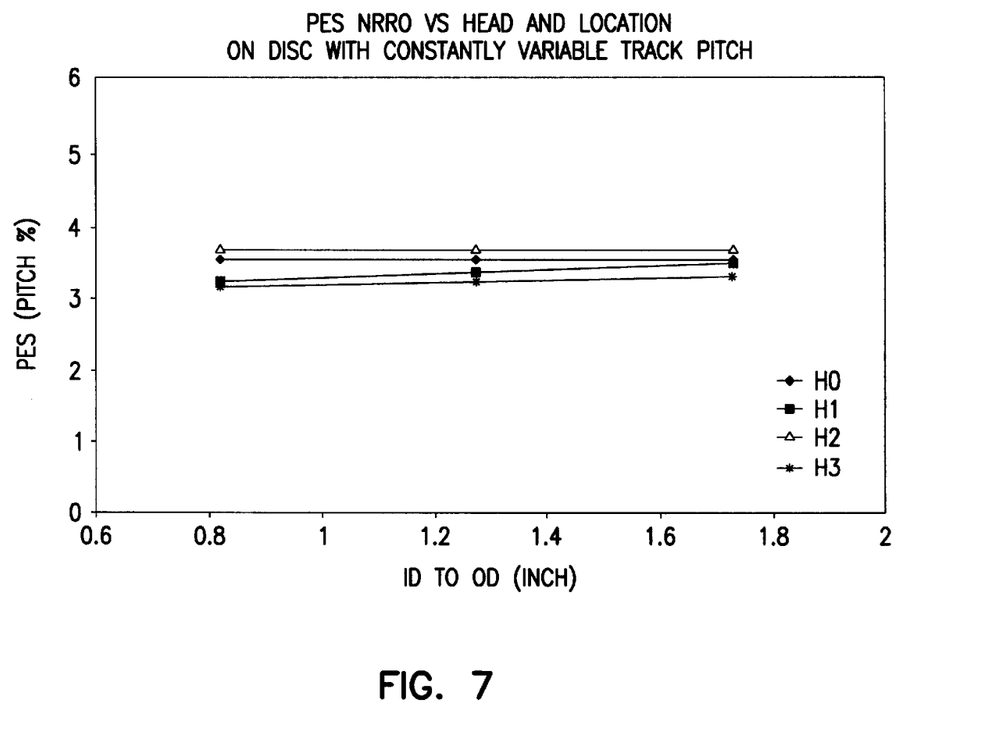
FIG. 7 is graph showing the amount of position error contributing to track misregistration as a function of the head with respect to the disc when using the variable.

FIG. 7 is a graph showing the amount of track misregistration is a function of the position of the head with respect to the disc that uses a constantly varying track pitch. FIG. 7 corresponds to the embodiment of the invention shown in FIG. 4 wherein the tracks are constantly varying in pitch such that the track gets wider or there are less tracks per inch at the outer diameter than at the inner diameter. As can be seen from FIG. 7 where four heads, head 0, head 1, head 2, and head 4, are measured, the amount of track misregistration remains essentially constant across the surface of the disc. In other words, the amount of position error signal or number of occurrences of track misregistration remains at approximately 3½% for each of the heads, head 1, head 2, head 3 and head 0, as the head position varies from 0.8 inches to 1.7 inches as depicted by the graph shown in FIG. 7.

Figure 8:
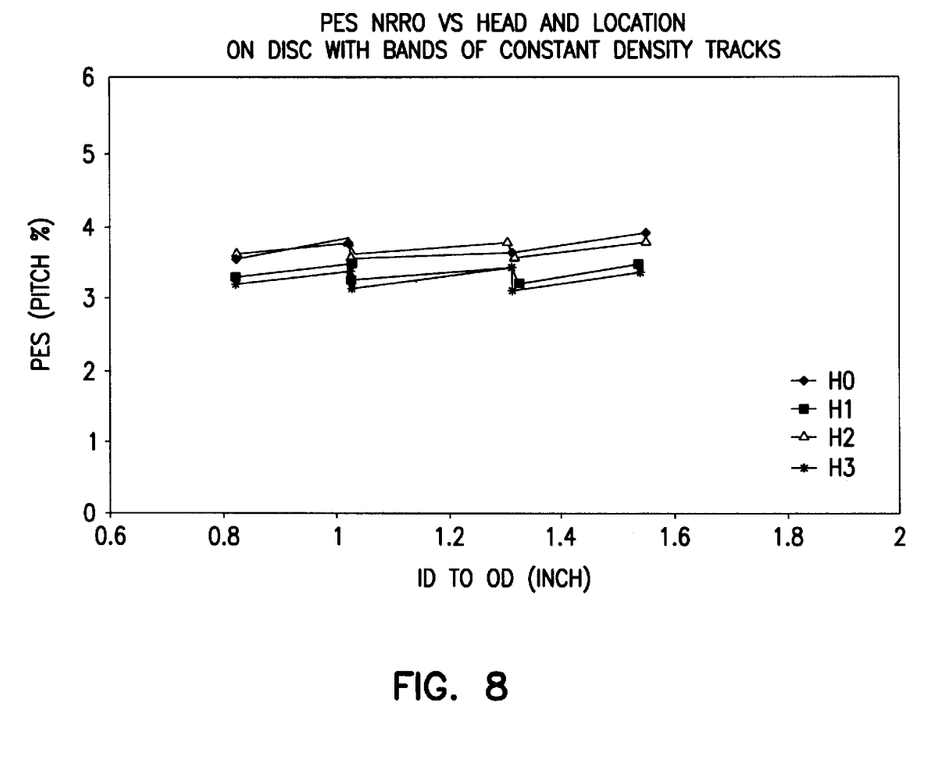
FIG. 8 is graph showing the amount of position error contributing to track misregistration as a function of the head with respect to the disc when the tracks are placed into zones having different track densities within each zone.

FIG. 8 is a graph showing the amount of track misregistration as a function of the location of the head with respect to the disc when the tracks are placed into groups in which tracks in the group have a constant track density. Again, in FIG. 8, four heads have been measured, head 1, head 2, head 3 and head 0. The number of track misregistrations is placed on the Y axis while the physical position of the head 150 with respect to the disc 134 is placed on the X axis. Within each zone, the position error signal or the number of track misregistrations climbs slightly from the inner part of the zone or grouping of tracks to the outer part of the zone or grouping of tracks. FIG. 8 shows a disc which has three groupings of tracks or three zones of tracks. Each of the zones or groupings of tracks has constant track density within the zone. In other words, FIG. 8 corresponds to the position error signal or the number of track misregistrations that would be found across a disc such as that shown in FIG. 6. FIG. 6 contains three zones 510, 610 and 512 in which each of the groups of tracks within the zone are at a constant track density. In addition, each of the track densities within each of the zones 510, 610 and 512 are different. As can be seen from FIG. 8, for example, within the inner zone, the position error signal which also correlates to the percentage of track misregistrations, climbs from 0.8 inches to 1.0 inches and then drops at the zone boundary and then climbs again from 1.0 inches to approximately 1.3 inches. At 1.3 inches, the tracks are now in zone 512 and the position error signal which indicates the number of track misregistrations that are occurring, climbs from where the head is positioned at the inner diameter of the zone to the outer diameter of the zone which occurs at approximately 1.6 inches. This occurs for all four heads that were studied or graphed in this particular graph.

Advantageously, the disc drive which uses the above inventions has additional capacity. The disc for the disc drive allows additional information to be stored on the disc drive without an appreciable rise in the error rate. The disc is formatted to allow for additional data to be stored on the disc. The tracks per inch or track density of the groups of tracks on the disc of the disc drive serves to limit the amount of read and write errors that occur. As a result, the access times to information including customer data is unaffected by increased track density since the track density is selected so that the percentage of track misregistrations stays within a selected range. The result is that the disc in the disc drive is formatted so as not to allow the occurrence of track misregistration to climb over a selected percentage. Still a further advantage is that the method and apparatus used to format the disc in the disc drive do not deviate appreciably from current technologies. Therefore, the above inventions can be accommodated using manufacturing techniques close to current manufacturing techniques.

Figure 9:
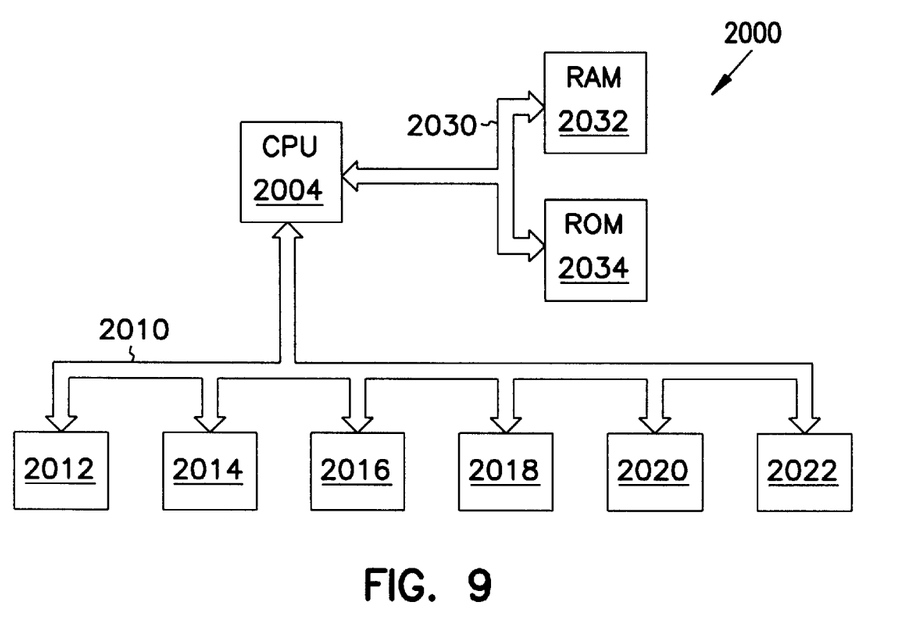
FIG. 9 is a schematic view of a computer system.

FIG. 9 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

Conclusion

In conclusion, a disc drive 100 includes a base 112, and a disc 134 rotatably attached to the base 112. The disc has an inner diameter and an outer diameter and a plurality of tracks. Information is written on the plurality of tracks. The plurality of tracks 400, 402, 404, 406, 408, 410 are written at a variable track pitch. The tracks positioned near the outer diameter 220 are wider in pitch than the tracks positioned near the inner diameter 230. The plurality of tracks 500, 502, 504, 506 further include a first group 510 of tracks written at a first track pitch, and a second group 512 of tracks written at a second track pitch. The first group 510 of tracks has a greater track pitch than the second group 512 of tracks. The first group 510 of tracks is positioned at a greater radial distance from the center 210 of the disc 134 than the first group 510 of tracks. The first group 510 of tracks or the second group 512 of tracks has a greater track pitch than the other of the first group of tracks or the second group of tracks. Furthermore, the track pitch of each of the first group and the second group of tracks is selected such that the percentage of track misregistration for each group will be substantially the same. The track pitch is varied to keep the percentage of track misregistration for each group substantially the same. The disc drive 134 also includes an actuator 120 having a transducer 150 for reading and writing to at least two of the plurality of tracks 500, 502, 504, 506 on the disc 134. The transducer 115 writes data at different frequencies.

Also disclosed is a disc 134 for a disc drive 100 including a first surface 135, a second surface 136, and a plurality of concentric tracks 500, 502, 504, 506 located on one of the first surface 135 or the second surface 136. The plurality of concentric tracks 500, 502, 504, 506 include a first group 510 of tracks written at a first track density, and a second group 512 of tracks written at a second track density. The first track density is different than the second track density. If first track density is greater than the second track density, the first group 510 of tracks is positioned nearer to the center 210 of the disc 134 than the second group 512 of tracks. On the disc 134, the first group 510 of tracks has information written at a different frequency that the information in the second group of tracks. A third group 610 of tracks 602, 604 written at a third track density which is different than the first track density and the second track density is also contemplated. The track density for the first group 510 is selected so that the percentage of track misregistration is substantially equal to a selected value. The track density for the second group 512 is also selected so that the percentage of track misregistration is substantially equal to a selected value. In other words, the track density for the first group 510 and the track density for the second group 512 is selected so that the percentage of track misregistration is substantially equal to a selected value. In addition, the track density for the first group 510 and the track density for the second group 512 is selected in response to the percentage of track misregistration.

A disc drive 100 is also disclosed which includes a base 112 and a disc 134 rotatably attached to the base 112. The disc 134 has tracks for storing information. The disc drive 100 also includes a movable actuator 120 having a transducer 150 positionable near said tracks, and a device for maintaining the percentage of occurrences of track misregistration between the track and the transducer to a selected range.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:

determining non-repeatable runout (NRRO) error for a data transducing head across a recording medium; and defining a plurality of concentric data tracks on the recording medium having different track densities at different diameters of the recording medium in relation to said determined NRRO error.

2. The method of claim 1, wherein the defining step comprises providing a first set of data tracks adjacent an outermost diameter (OD) of the recording medium with a first track density and a second set of data tracks adjacent an innermost diameter (ID) of the recording medium with a second track density greater than the first track density.

3. The method of claim 1, wherein the defining step comprises dividing the recording medium into a plurality of concentric zones, and providing the data tracks within each zone with a respective, selected track density.

4. The method of claim 1, wherein the defining step comprises selecting the track densities so that a component of a position error signal (PES) induced by the NRRO error for each said data track is maintained at a substantially constant level.

5. The method of claim 1, wherein the determining and defining steps are performed for a first recording medium, and wherein the method further comprises repeating the determining and defining steps for a second recording medium axially coupled to the first recording medium.

6. The method of claim 1, wherein the recording medium is characterized as a magnetic recording disc in a disc drive.

7. The method of claim 1, wherein the NRRO error determined during the determining step is induced at least in part by windage effects upon the head during rotation of the recording medium which vary with respect to radial location of the head.

8. The method of claim 1, wherein the NRRO error determined during the determining step is induced at least in part by vibration of the recording medium during rotation of said medium.

9. A recording medium configured to store data on a plurality of concentric data tracks defined by determining non-repeatable runout (NRRO) error for a data transducing head across the recording medium, and selecting different track densities for said plurality of concentric data tracks at different diameters on the recording medium in relation to said determined NRRO error.

10. The recording medium of claim 9, comprising a first set of data tracks adjacent an outermost diameter (OD) of the recording medium with a first track density and a second set of data tracks adjacent an innermost diameter (ID) of the recording medium with a second track density greater than the first data track density.

11. The recording medium of claim 9, wherein the plurality of concentric data tracks are divided among a plurality of concentric zones, with the data tracks within each zone having a respective, selected track density.

12. The recording medium of claim 9, wherein the data track densities of said data tracks are selected to maintain a component of a position error signal (PES) induced by the NRRO error for each said data track is maintained at a substantially constant level.

13. The recording medium of claim 9 in combination with a second recording medium axially coupled to the first recording medium, the second recording medium having a second plurality of concentric data tracks defined by determining a second NRRO error for a second data transducing head moved across the second recording medium, and selecting different track densities for said second plurality of concentric data tracks at different diameters on the second recording medium in relation to said determined second NRRO error.

14. The recording medium of claim 9 characterized as a magnetic recording disc in a disc drive.

* * * * *